Oct. 18, 1949.     T. KELLY     2,485,202
SCREW ACTUATED TIRE PRESS WITH CIRCUMFERENTIALLY
DISTRIBUTED THRUST ELEMENTS
Filed Oct. 18, 1945     2 Sheets-Sheet 1
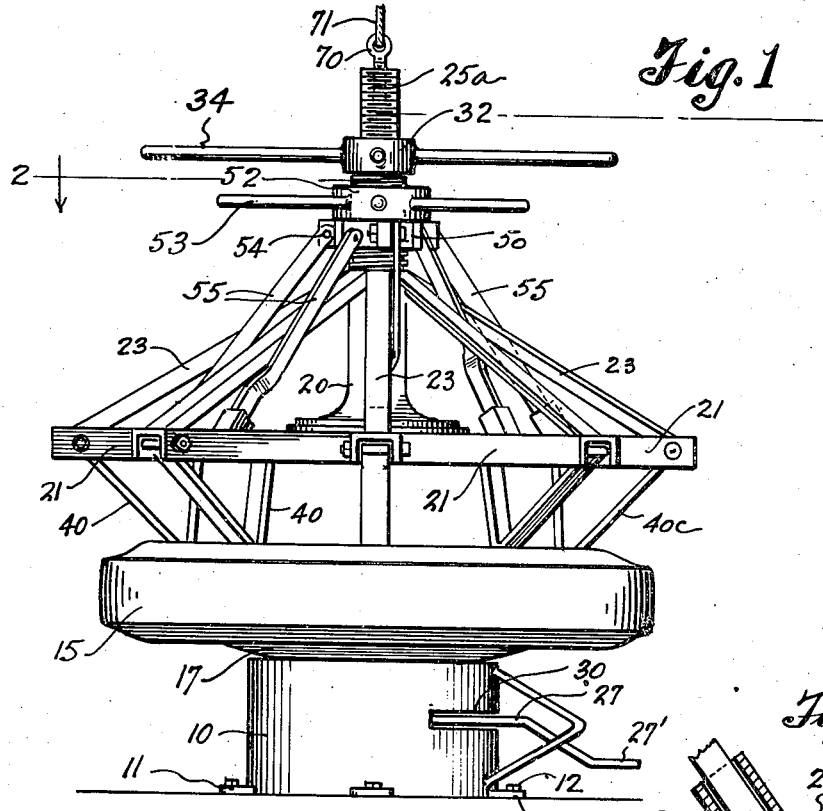
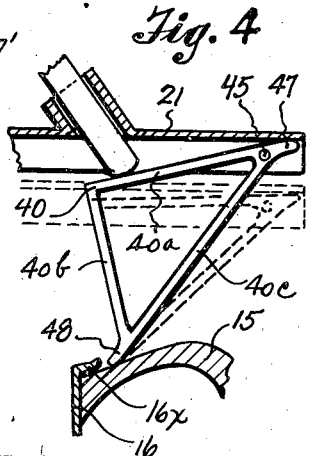
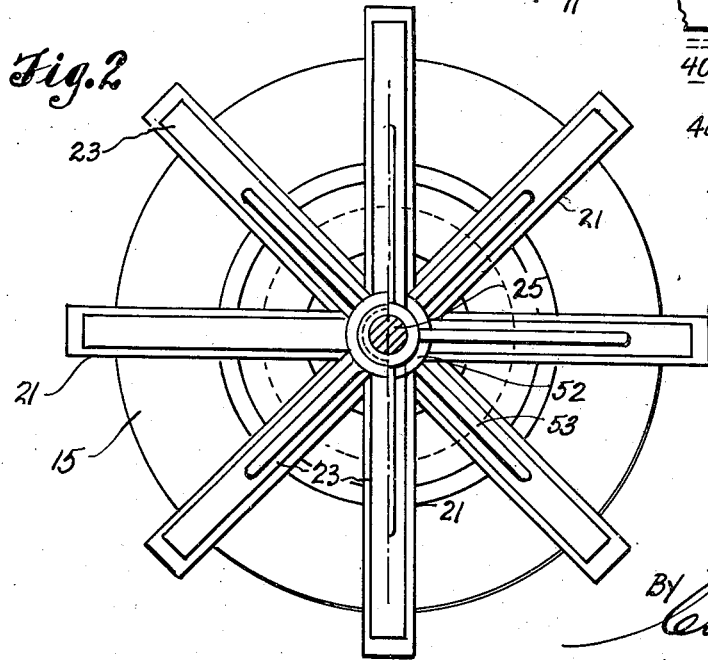
INVENTOR
TED KELLY
BY Cook & Robinson
ATTORNEYS

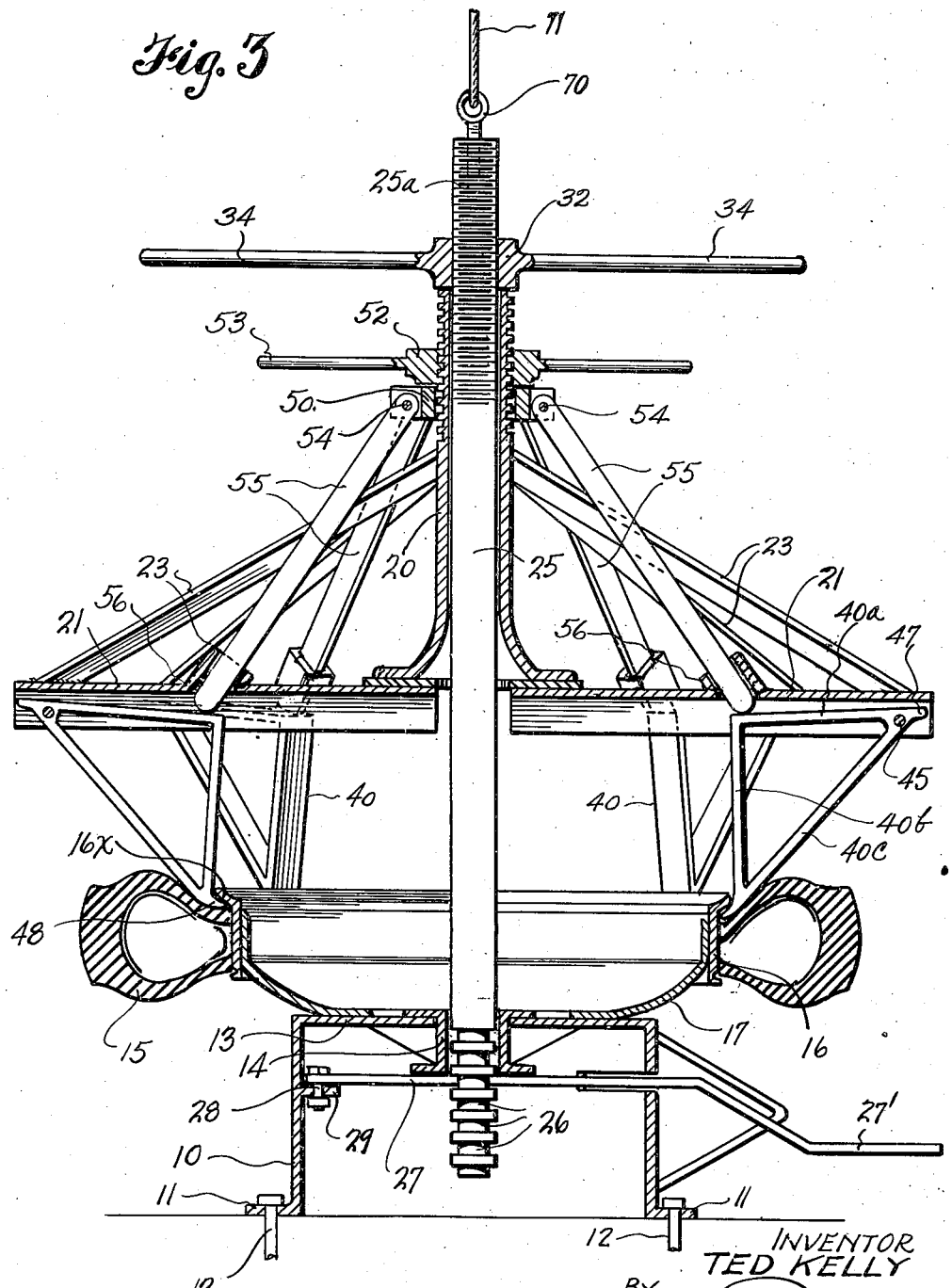

Patented Oct. 18, 1949

2,485,202

UNITED STATES PATENT OFFICE 2,485,202

SCREW ACTUATED TIRE PRESS WITH CIRCUMFERENTIALLY DISTRIBUTED THRUST ELEMENTS

Ted Kelly, Port Angeles, Wash.

Application October 18, 1945, Serial No. 623,025

2 Claims. (Cl. 157—1.2)

This invention relates to tire presses and it has reference more particularly to improvements in apparatus designed for the mechanical removal of pneumatic tire casings as used on auto trucks, buses and the like, from their mounting rims.

Explanatory to the present invention, it will here be stated that it is sometimes extremely difficult to remove tire casings from their rims for repair or replacement. This is especially true of those heavy casings as used on trucks, trailers, buses or other vehicles that carry extremely heavy loads and where high inflating pressures are used; this removal difficulty being due to various reasons, and by ordinary methods of removal, such as by pounding on the casing sides, much time is lost and damage to the casing may result. The removal difficulty apparently is due for the most part to the sticking of the casing flaps to the rim and it is frequently required that several tons pressure be applied to displace the casing from its rim.

In view of the foregoing, it has been the principal object of this invention to provide a mechanical press whereby tire casings may be easily and readily pressed from their mounting rims without damage to the casing or tire contained therein.

It is also an object of the invention to provide a tire removing press that may be used for the removal of tires or casings of different size.

A still further object of the invention resides in the provision of a tire press whereby removal pressure may be applied equally to the side wall of a casing at equally spaced intervals thereabout to effect removal thereof without any detrimental effects to or damaging strain on the casing material.

Still further objects of the invention reside in the details of construction of parts embodied in the press and in their combination, relationship and mode of use as will hereinafter be fully described.

In accomplishing these and other objects of the invention, I have provided the improved details of construction, the preferred forms of which are illustrated in the accompanying drawings, wherein—

Fig. 1 is a side view of a tire press embodied by the present invention as applied in readiness for the removal of a tire casing from a rim.

Fig. 2 is a plan view of the same, partly in section.

Fig. 3 is a vertical, sectional view of the tire press.

Fig. 4 is a detail showing the manner of mounting, and the pivotal action of one of the pressure brackets.

Briefly described, the present press comprises a base member upon which a wheel, from which a casing is to be removed, may be flatly disposed, and an upper structure for engaging and pressing the casing from the wheel; this upper structure comprises a central anchor shaft that may be applied at its lower end to the base member and secured thereto, coaxial of the wheel and a pressure applying frame that is slidable downwardly on the shaft for engaging against the top side of the casing and adapted to be actuated downwardly therealong by a nut threaded onto the upper end portion of the shaft, to force the casing from the wheel rim. The pressure applying frame is equipped with a plurality of radial arms on which tire engaging brackets are mounted, and these have pivotal mounting that permits them to be adjusted to suit wheels of different diameters.

Referring more in detail to the drawings—

In its present preferred form of construction, the tire press comprises a base housing or anchoring member 10 of cylindrical form, here shown as being equipped with peripheral flanges 11 about its base for receiving anchor bolts 12 to secure this member to a floor if such is desired. This housing has a flat, horizontal top wall 13 formed with a central opening in which a tubular sleeve 14 is fixed for the reception of the anchor shaft of the upper structure as will presently be explained. It is upon this base housing or anchor member that a truck wheel, or the like, is disposed for the removal of a casing therefrom. The mode of applying the wheel to the base member is best shown in Fig. 3, wherein 15 designates the tire casing mounted upon a rim 16. The rim is fixed to the periphery of the wheel body disk 17 which has a central opening for reception of the wheel hub. In applying the wheel to the base member preparatory to removal of the casing from the rim, the body disk 17 is placed flatly upon the upper end wall 13 of the base housing and the wheel is axially centered about the sleeve 14 that is fixed in the upper wall of the base member.

It is to be understood that prior to placing the wheel in place on the base member for removal of the casing, the rim retainer ring is removed from the rim channel and the wheel is placed in position on the housing 10 with this unsecured flange of the casing at the under side of the wheel.

The tire engaging part of this press, which has been referred to as the upper structure, comprises a tubular, vertically extending hub member 20, to the lower end of which a plurality of radially directed, equally spaced arms or spokes 21 are fixed to extend in the same horizontal plane. Diagonal brace bars 23 extend from the medial portion of the hub member to the outer ends of the radial arms. These arms, preferably are of channel iron, faced downwardly as shown.

The brace members 23 may be tubes, channel or angle iron members, and may be welded or otherwise secured.

Contained slidably in the tubular hub member 20 is an anchor shaft 25 which projects substantially below the lower end of the hub and is formed along its lower end portion with a succession of annular grooves 26. This lower end of the shaft is designed to project down through the sleeve 14, fixed in the upper end wall 13 of the base member, and to be holdingly engaged by and between a pair of lock levers 27, only one of which is shown. These levers are horizontally disposed within the base housing and have their inner ends pivotally secured as at 28 to a flange 29 projecting inwardly from the housing wall.

The outer ends of the levers extend through slots 30 in the opposite housing wall, and have handle portions 27' at their outer ends. When the shaft end has been passed downwardly into the base housing through the sleeve 14, it may be locked against shifting by swinging the two levers 27 toward each other to seat the edges thereof in one of the annular channels 26 of the shaft.

The upper end portion of the shaft 25 is threaded as at 25a and adjustable therealong is a nut 32 with radial arms 34 to turn it. This nut may be engaged with the upper end of the hub member to move it downwardly along the anchored shaft for the removal of a tire from its rim by the means provided and presently described.

One of the features of the invention resides in the provision and manner of mounting the tire engaging brackets on the radial arms 21. As observed best in Fig. 3, each radial arm mounts, at its outer end, a triangular bracket 40 that is disposed in the plane of the arm directly below its outer end portion. Each bracket comprises a substantially horizontally directed base member 40a, a substantially vertically directed leg 40b extended down from the inner end of the base member, and a diagonal brace member 40c that extends from the outer end of the base member to the lower end of the vertical leg. Each bracket is pivoted by a horizontal bolt 45 to the outer end of the radial arm that supports it, so as to have limited up and down swinging action at its inner end. This swinging action of the bracket in a plane radial of the wheel, permits its lower end to move toward and from the shaft 25 which is required for the intended use of the device.

It will be observed in Fig. 3 that there is a short extension 41 at the outer end of the base member of each bracket designed to engage against the base wall of the supporting radial arm to limit the downward and outward swinging of the inner end of the bracket. Also, it is to be observed that the bracket is equipped at its inner, lower end with an inwardly curved finger 48 as a continuation of the bar 40c for engaging against the top wall of the tire casing and to extend below the rim flange 16x as shown in Fig. 3.

For a purpose presently described, I have provided a collar 50 that is slidably fitted about the upper end portion of the tubular hub 25, and this is adapted to be engaged by a nut 52 that is threaded onto the upper end portion of the hub. This nut has radial arms 53 for turning it, and it may be adjusted up or down along the hub.

Pivotally affixed to the collar by pivot bolts 54, are brace rods 55 that extend down and through slots 56 in the radial arms to engage against the inner end portions of the brackets. Thus, by the up and down adjustment of the collar 50, the upward swing of the brackets may be limited. Also, this serves as a means of limiting the inward swinging of the lower end portions of the brackets.

If desirable, anti-friction bearings may be disposed between the upper end of hub 20 and the nut 32.

Assuming the device to be so constructed, its use for pressing a tire from a rim would be as follows: First, with the upper structure of the press lifted clear of the base, or anchor member, the wheel from which a tire is to be removed is placed horizontally and flatly upon the upper end of the base member 10 concentrically thereof, as in Fig. 3, after the tire retainer ring has been removed from the rim edge; the wheel body disk being placed flatly against the upper end wall of the anchor housing concentric of the housing. Then the upper structure is lowered to place so that the lower end portion of shaft 25 will extend down through the sleeve 14.

The upper structure is then brought to rest against the top wall of the tire casing with the fingers 48 of the several brackets engaged against the tire wall adjacent the flange 16 of the rim. The lower end of the shaft 25 is then anchored in the housing 10 by the inward swinging of the paired levers 27—27 to seat the edges thereof in one of the annular channels 26 of the shaft. Then, ordinarily, the nut 52 is backed away from the collar 50 and the nut 32 is run down on shaft 25 and tightened against the upper end of the hub 25 to force the hub down along shaft 25. This downward shifting of the hub causes all brackets 40 to be pressed downwardly against the tire wall and at the same time to pivot on their mounting bolts 45 in a manner that causes their lower ends and the fingers 48 at their lower ends to move inwardly and downwardly, the fingers thereby being caused to pass below the rim flange 16x into engagement with the base wall of the rim. When the fingers reach the base wall of the rim, the brackets 40 are then locked against further inward pivotal action by reason of their base members engaging the base walls of the radial arms that mount them.

Then the nut 32 is run down on the threaded end portion of shaft 25 and this moves the hub accordingly and all brackets act simultaneously against the tire casing to press it from the rim. In the present instance, eight brackets are used, but this may be more or less. After the casing falls from the rim, the clamp levers 27—27 may be opened apart, thus to release the shaft 25 and the upper structure may be lifted into the clear, permitting the tire to be lifted from about the housing 10.

It has been found convenient for the lifting of this upper structure, to apply an eye bolt 70 to the upper end of shaft 25 and to attach a hoisting cable 71 thereto. The cable could pass over suitable pulleys and be attached to a counter weight to provide for easy handling of the structure.

If the tire casing should be of such shape, for example, an oversize casing on a narrow rim, that the fingers of the press brackets 40 would be guided over the rim flange 16x instead of beneath it when the brackets are moved downwardly, then the nut 52 would be so adjusted prior to the application of pressure through the brackets, as to cause the brace levers 55 to hold the brackets against any inward pivoting action until the casing had been pressed down sufficiently below the rim flange 16x to give clearance for the fingers to enter beneath the flange, at which time nut 52 is loosened. Then tightening of nut 32 is proceeded with until the tire is removed. In most cases, this assembly of parts, 52, 20 and 55 is not necessary. It is only used when the fingers 48 do not engage with rim flange correctly.

Devices of this kind have been found practical, easy to use and capable of removing the most difficult tires in a very short time. They may be made of various materials and it is apparent that details may be changed without departing from the spirit of the invention.

Tire presses of the above character may be operated manually or mechanically through the use of power devices, electrically, hydraulically or by air.

The particular advantages in this apparatus reside in the provision for the pressure applying brackets to be forced both vertically and horizontally under a rim flange by the application of the downward pressure. This is distinguished from the usual method of forcing the fingers under the rim flange by a mechanical screw or the like, then proceeding with the downward pressure. The present operation accomplishes the work in one continuous operation.

An added advantage is that no lifting of the tire is necessary to place it in an operating frame. It is simply rolled to position and laid down upon the base and the operation can be accomplished easily by one person.

Having thus described my invention, what I claim as new therein and desire to secure by Letters Patent is:

1. A press for the removal of tires from wheels of the character described comprising a base member designed for the flat support thereon of a wheel body, an anchor shaft designed to be detachably secured at its lower end in said base to extend upwardly therefrom centrally of the wheel, an upper frame structure comprising a tubular hub portion slidable on the upper portion of the anchor shaft and a plurality of radial arms fixed to the hub overlying and extending beyond the wheel as mounted on the base member, a bracket pivotally mounted on each radial arm to swing in a radial plane and having a downwardly and inwardly directed leg designed to engage at its inner end against the top wall of the tire casing, means adjustably mounted on the hub portion for limiting the inward movement of the lower ends of the brackets, and a nut threaded on the upper end portion of the anchor shaft and adjustable therealong against the frame hub to move the frame downwardly for the removal of the casing from the wheel by the said brackets.

2. A press for the removal of tires from wheels of the character described comprising a base member designed for the flat support thereon of a wheel body, an anchor shaft secured at its lower end in said base to extend upwardly therefrom centrally of the wheel, an upper frame structure comprising a tubular hub portion slidable on the upper portion of the anchor shaft and said frame extending beyond the wheel as mounted on the base member and having openings therethrough, brackets pivotally mounted in the frame at its periphery to swing in a radial plane and each having a downwardly and inwardly directed leg designed to engage against the top wall of the tire casing, a nut threaded on the upper portion of the anchor shaft to engage said hub to effect an application of tire removing pressure; said hub having an exteriorly threaded portion, a collar slidable thereover, brace bars with ends pivoted in the collar and opposite ends passed through the frame openings engaged with the brackets to limit their inward movement on their pivoted mountings and a nut threaded onto the hub to determine the position of the said collar and stopping position of the brackets.

TED KELLY.

REFERENCES CITED

The following references are of record in the file of this patent:

UNITED STATES PATENTS

| Number | Name | Date |
| --- | --- | --- |
| 1,564,496 | Staugaard | Dec. 8, 1925 |
| 1,641,083 | Hite | Aug. 30, 1927 |
| 1,646,511 | Weaver | Oct. 25, 1927 |
| 1,724,813 | Weaver | Aug. 13, 1929 |
| 2,373,975 | Plumeau | Apr. 17, 1945 |